United States Patent
Kwon et al.

(10) Patent No.: US 9,030,429 B2
(45) Date of Patent: May 12, 2015

(54) TOUCHSCREEN HAVING A CAPACITANCE SENSING APPARATUS

(75) Inventors: Yong Il Kwon, Gyunggi-do (KR); Moon Suk Jeong, Gyunggi-do (KR); Byeong Hak Jo, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 135 days.

(21) Appl. No.: 13/611,166

(22) Filed: Sep. 12, 2012

(65) Prior Publication Data

US 2014/0009432 A1 Jan. 9, 2014

(30) Foreign Application Priority Data

Jul. 9, 2012 (KR) .................. 10-2012-0074468

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ...................................... G06F 3/044
USPC ........................................ 345/173
See application file for complete search history.

(56) References Cited

U.S. PATENT DOCUMENTS

| 2011/0242048 | A1 | 10/2011 | Guedon et al. | |
|---|---|---|---|---|
| 2012/0062499 | A1* | 3/2012 | Weaver et al. | 345/174 |
| 2012/0139846 | A1* | 6/2012 | Krah et al. | 345/173 |
| 2012/0194469 | A1* | 8/2012 | Wang et al. | 345/174 |
| 2012/0287077 | A1* | 11/2012 | Pant et al. | 345/174 |

FOREIGN PATENT DOCUMENTS

| JP | 2010-250522 | 11/2010 |
|---|---|---|
| KR | 10-1041586 | 6/2011 |
| KR | 10-2011-0118520 | 10/2011 |
| KR | 10-2011-0137482 | 12/2011 |
| KR | 10-2012-0017887 | 2/2012 |

OTHER PUBLICATIONS

Korean Office Action mailed Aug. 28, 2013 in corresponding Korean Application No. 10-2012-0074468.

* cited by examiner

*Primary Examiner* — Long D Pham

(57) ABSTRACT

There is provided a capacitance sensing apparatus including: a driving circuit unit applying a driving signal having a common level potential and first and second level potentials different from the common level potential to a first capacitor; a sensing circuit unit detecting a change in capacitance generated in the first capacitor; and a gain controlling circuit unit controlling a gain of the sensing circuit unit, wherein the sensing circuit unit includes a second capacitor charged by the change in capacitance of the first capacitor when a level of the driving signal is changed from the first level potential to the common level potential or changed from the common level potential to the second level potential.

18 Claims, 4 Drawing Sheets

TOUCHSCREEN HAVING A CAPACITANCE SENSING APPARATUS

CROSS-REFERENCE TO RELATED APPLICATIONS

This application claims the priority of Korean Patent Application No. 10-2012-0074468 filed on Jul. 9, 2012, in the Korean Intellectual Property Office, the disclosure of which is incorporated herein by reference.

BACKGROUND OF THE INVENTION

1. Field of the Invention

The present invention relates to a capacitance sensing apparatus and method, and a touch screen apparatus.

2. Description of the Related Art

A touch sensing apparatus such as a touch screen, a touch pad, or the like, an input apparatus integrated with a display apparatus to provide an intuitive input method to a user, has recently been widely used in various electronic apparatuses such as a portable phone, a personal digital assistant (PDA), a navigation device, or the like. Particularly, as demand for smart phones has grown in recent times, the use of a touch screen as a touch sensing apparatus capable of providing various input methods in a limited form factor has correspondingly increased.

Touch screens used in portable apparatuses may be largely classified as resistive-type touch screens and capacitive-type touch screens according to a method of sensing a touch input utilized therein. Here, capacitive-type touch screens have advantages in that they have a relatively long lifespan and various input methods and gestures may be used therewith, such that the use thereof has increased. Particularly, a multi-touch interface may more easily be implemented in capacitive-type touch screens as compared to resistive-type touch screens, such that a multi-touch interface is widely used in smart phones, and the like.

Capacitive-type touch screens include a plurality of electrodes having a predetermined pattern defining a plurality of nodes in which a change in capacitance is generated by a touch input. In the plurality of nodes distributed on a two-dimensional plane, a change in self-capacitance or a change in mutual-capacitance is generated by the touch input. Coordinates of the touch input may be calculated by applying a weighted average method, or the like, to the change in capacitance generated in the plurality of nodes. In order to accurately calculate the coordinates of the touch input, a technology capable of accurately sensing the change in capacitance generated by the touch input is required. However, in the case in which electrical noise is generated in a wireless communications module, a display apparatus, or the like, it may hinder the change in capacitance from being accurately sensed.

RELATED ART DOCUMENT (Patent Document 1) Korean Patent Laid-Opened Publication No. 2011-118520
(Patent Document 2) Korean Patent Laid-Opened Publication No. 2011-137482

SUMMARY OF THE INVENTION

An aspect of the present invention provides a method of significantly reducing an influence of noise on a target change in capacitance to be measured in the case in which noise is generated.

Another aspect of the present invention provides a capacitance sensing apparatus and method, and a touch screen apparatus capable of offsetting signal noises by applying a driving signal having a common level potential and first and second level potentials different from the common level potential to a capacitor and integrating and outputting a change in capacitance from the capacitor, according to the driving signal.

According to an aspect of the present invention, there is provided a capacitance sensing apparatus including: a driving circuit unit applying a driving signal having a common level potential and first and second level potentials different from the common level potential to a first capacitor; a sensing circuit unit detecting a change in capacitance generated in the first capacitor; and a gain controlling circuit unit controlling a gain of the sensing circuit unit, wherein the sensing circuit unit includes a second capacitor charged by the change in capacitance of the first capacitor when a level of the driving signal is changed from the first level potential to the common level potential or changed from the common level potential to the second level potential.

The gain controlling circuit unit may include at least one gain controlling capacitor charged or discharged by an input signal having a phase opposite to that of the driving signal to control the gain of the sensing circuit unit.

The capacitance sensing apparatus may further include an operating unit determining a touch input based on an output signal of the sensing circuit unit.

A level of an output signal of the sensing circuit unit may be increased when the level of the driving signal is changed from the first level potential to the common level potential or changed from the common level potential to the second level potential.

The sensing circuit unit may include an integrating circuit non-inverting and integrating the second capacitor by the driving signal.

A level of an output signal of the sensing circuit unit may be increased at least twice during a single period of the driving signal.

According to another aspect of the present invention, there is provided a method of sensing changes in capacitance in a plurality of first capacitors defined in intersections between a plurality of first electrodes and a plurality of second electrodes, the method comprising: applying a driving signal having a common level potential and first and second level potentials different from the common level potential to at least one of the first capacitors to charge the at least one first capacitor; generating an output voltage by charging a second capacitor with charges from the at least one first capacitor when a level of the driving signal is changed from the first level potential to the common level potential or changed from the common level potential to the second level potential; and controlling a gain of the output voltage.

In the controlling of the gain of the output voltage, the gain may be controlled by allowing a gain controlling capacitor to be charged or discharged according to an input signal having a phase opposite to that of the driving signal.

The generating of the output voltage may be performed by allowing the output voltage to be increased when the level of the driving signal is changed from the first level potential to the common level potential or changed from the common level potential to the second level potential, through a non-inverting amplifying circuit.

The method may further include determining a touch input generating the change in capacitance based on the output voltage.

According to another aspect of the present invention, there is provided a panel unit including a plurality of driving electrodes and a plurality of sensing electrodes; a driving circuit unit applying a driving signal to the plurality of driving electrodes; a sensing circuit unit sensing changes in capacitance generated in intersections between the driving electrodes to which the driving signal is applied and the plurality of sensing electrodes; and a controlling unit controlling operations of the driving circuit unit and the sensing circuit unit, wherein the driving signal has a common level potential and first and second level potentials different from the common level potential, and the controlling unit includes a gain controlling circuit unit controlling a gain of the sensing circuit unit.

The gain controlling circuit unit may include at least one gain controlling capacitor charged or discharged by an input signal having a phase opposite to that of the driving signal to control the gain of the sensing circuit unit.

The sensing circuit unit may generate an output signal transferred to the controlling unit based on the changes in capacitance when a level of the driving signal is changed from the first level potential to the common level potential or changed from the common level potential to the second level potential.

The controlling unit may determine a touch input applied to the panel unit based on the output signal of the sensing circuit unit.

The sensing circuit unit may generate the output signal of which a level is increased at least twice during a single period of the driving signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
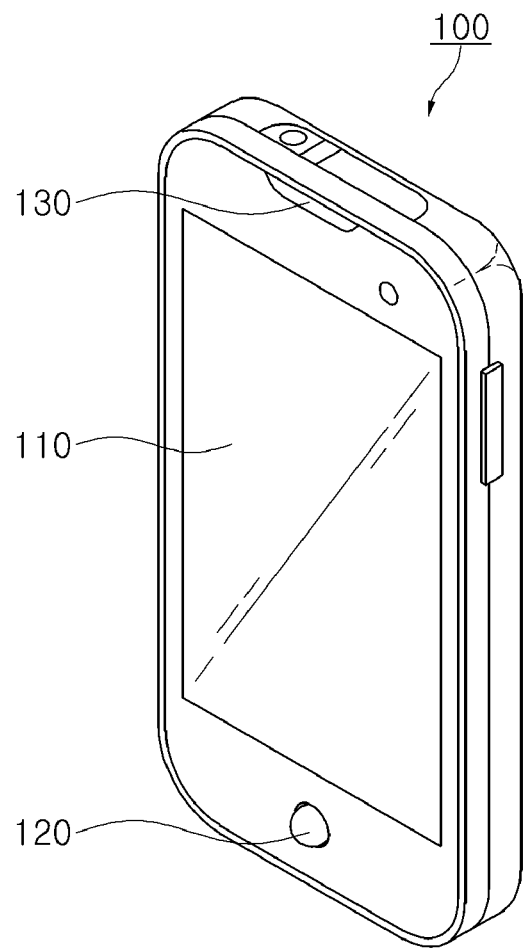
FIG. 1 is a perspective view illustrating an exterior of an electronic apparatus including a touch screen apparatus according to an embodiment of the present invention.

Embodiments of the present invention will hereinafter be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and scope of the present invention. In addition, it should be understood that positions and arrangements of individual components in each embodiment may be changed without departing from the spirit and scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present invention will be described in detail with reference to the accompanying drawings so that those skilled in the art may easily practice the present invention.

FIG. 1 is a perspective view illustrating an exterior of an electronic apparatus including a touch screen apparatus according to an embodiment of the present invention. Referring to FIG. 1, an electronic device 100 according to the embodiment of the present invention may include a display apparatus 110 for outputting an image, an input unit 120, an audio unit 130 for outputting audio, and a touch screen apparatus integrated with the display apparatus 110.

As shown in FIG. 1, in the case of a mobile apparatus, the touch screen apparatus may be generally provided in a state in which it is integrated with the display apparatus and needs to have light transmissivity high enough to allow the image displayed by the display apparatus to be transmitted therethrough. Therefore, the touch screen apparatus may be implemented by forming sensing electrodes formed of a transparent, electrically conductive material such as indium-tin oxide (ITO), indium zinc oxide (IZO), zinc oxide (ZnO), carbon nano tube (CNT), or graphene on a base substrate formed of a transparent film material such as polyethylene terephthalate (PET), polycarbonate (PC), polyethersulfone (PES), polyimide (PI), or the like. A wiring pattern connected to the sensing electrodes formed of the transparent conductive material is disposed in a bezel region of the display apparatus 110, and is visually shielded by the bezel region, and thus the wiring pattern may be formed of a metal material such as silver (Ag), copper (Cu), or the like.

Since it is assumed that the touch screen apparatus according to the embodiment of the present invention is operated in a capacitive scheme, the touch screen apparatus may include a plurality of electrodes having a predetermined pattern. In addition, the touch screen apparatus according to the embodiment of the present invention may include a capacitance sensing apparatus for detecting a change in capacitance generated in the plurality of electrodes. Hereinafter, a capacitance sensing apparatus and a method of operation thereof according to an embodiment of the present invention will be described with reference to FIGS. 2 through 4.

Figure 2:
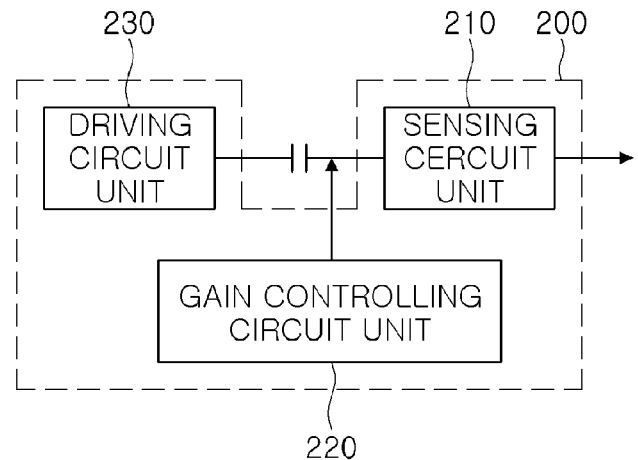
FIG. 2 is a block diagram illustrating a capacitance sensing apparatus according to an embodiment of the present invention.

FIG. 2 is a block diagram illustrating a capacitance sensing apparatus according to an embodiment of the present invention. Referring to FIG. 2, a capacitance sensing apparatus 200 according to the embodiment of the present invention may include a driving circuit unit 230, a sensing circuit unit 210, and a gain controlling circuit unit 220. A capacitor Cm in which a target change in capacitance to be measured is generated may be connected between the driving circuit unit 230 and the sensing circuit unit 210.

In FIG. 2, the capacitor Cm may correspond to a capacitor in which target capacitance to be measured by the capacitance sensing apparatus 200 according to the embodiment of the present invention is charged. For example, the capacitance of the capacitor Cm may correspond to mutual capacitance generated between a plurality of electrodes included in a capacitive-type touch screen. Hereinafter, for convenience of explanation, it is assumed that the capacitance sensing apparatus 200 according to the embodiment of the present invention senses a change in capacitance generated in the capacitive-type touch screen. In this case, the capacitor Cm may be a node capacitor where charges are charged or discharged according to a change in mutual capacitance generated in intersections between the plurality of electrodes.

The driving circuit unit 230 may generate a predetermined driving signal for charging the capacitor Cm with the charges and supplying the driving signal to the capacitor Cm. The driving signal may be a square wave signal having a pulse form and a predetermined frequency.

The driving signal may have a common level potential and first and second level potentials different from the common level potential, in which the common level potential and the first and second level potentials are regularly repeated at a predetermined period.

The sensing circuit unit 210 may include an operational amplifier and at least one capacitor, charged or discharged by the capacitor Cm. The sensing circuit unit 210 may generate an output voltage from an amount of charge charged in or discharged from the capacitor. That is, the output voltage of the sensing circuit unit 210 may be determined according to the capacitance of the capacitor Cm, the capacitance of the capacitor included in the sensing circuit unit 210, a voltage level of the driving signal, and the like. The sensing circuit unit 210 may include a plurality of switches. Operations of the switches may be controlled to control an operation of the sensing circuit unit 210.

The gain controlling circuit unit 220 may include at least one gain controlling capacitor that may be charged and discharged by an input signal having a common level potential and first and second level potentials different from the common level potential. In addition, the input signal may be a signal having a phase opposite to that of the driving signal applied to the capacitor Cm.

Figure 3:
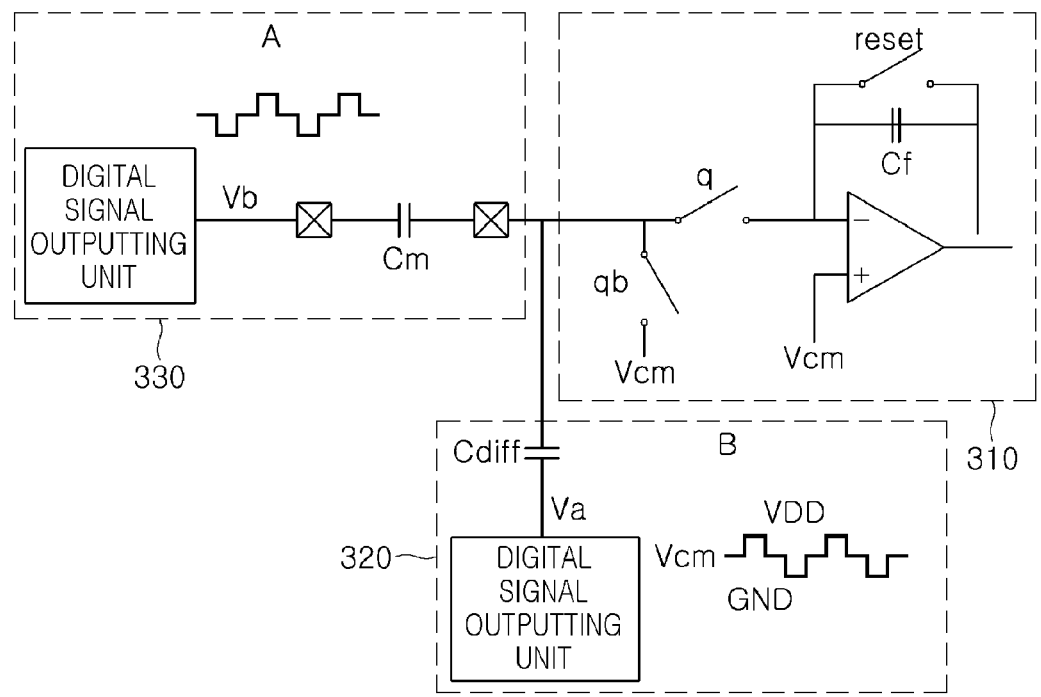
FIG. 3 is a circuit diagram illustrating a capacitance sensing apparatus according to an embodiment of the present invention.

FIG. 3 is a circuit diagram illustrating a capacitance sensing apparatus according to an embodiment of the present invention.

Referring to FIG. 3, a capacitance sensing apparatus according to the embodiment of the present invention may include a driving circuit unit 330, a sensing circuit unit 310, and a gain controlling circuit unit 320. Hereinafter, a detailed operation of the capacitance sensing apparatus according to the embodiment of the present invention will be described with reference to the circuit diagram shown in FIG. 3. Similar to FIG. 2, a capacitor Cm may correspond to a node capacitor of a capacitive-type touch screen.

The driving circuit unit 330 may include a digital signal outputting unit connected to a first node of the capacitor Cm. The digital signal outputting unit may output a driving signal having a common level potential and first and second level potentials different from the common level potential and apply the driving signal to the capacitor Cm. A level higher than the common level will be defined as a first level, while a level lower than the common level will be defined as a second level. A single period of the driving signal may be sequentially configured of the first level potential, the common level potential, the second level potential, and the common level potential.

Although FIG. 3 shows that the driving signal is generated through the digital signal outputting unit, a circuit having the common level potential, the first level potential, and the ground terminal may be provided to apply a driving signal using a switching circuit.

Meanwhile, the sensing circuit unit 310 may be connected to a second node of the capacitor Cm. The sensing circuit unit 310 may include an operational amplifier, a capacitor Cf, and switches q, qb, and reset. The switches q and qb may be operated at different times so that operation signals thereof have the same period as each other, but have phases opposite to each other. In the case in which the first level driving signal or the second level driving signal is applied to the capacitor Cm, the switch q is turned on, and the switch qb is turned off, charges may be charged in or discharged from the capacitor Cm by a difference in potential between a first or second level voltage and a common level voltage. The switch reset may be connected in parallel with the capacitor cf of the sensing circuit unit. When the switch reset is turned on, the operational amplifier may be reset. In the case in which the common level driving signal is applied to the capacitor Cm, the switch q is turned on, and the switch qb is turned off, the charges charged in the capacitor Cm may be transferred to the capacitor Cf. In this case, an output voltage Vbout of the operational amplifier may be represented by the following Equation 1.

$$V_{bout} = \frac{VDD * Cm}{CF1} \qquad \text{Equation 1}$$

As seen in Equation 1, the output voltage Vbout of the sensing circuit unit 310 may be determined according to a ratio of capacitance between the capacitor Cm and the capacitor Cf. Therefore, the capacitor Cf may be configured to have a significantly larger amount of capacitance than that of the capacitor Cm including target charges to be measured, thereby preventing the output voltage Vbout of the sensing circuit unit 310 from being saturated.

Meanwhile, in addition to the sensing circuit unit 310, the gain controlling circuit unit 320 may be connected to the second node of the capacitor Cm. The gain controlling circuit unit 320 may include a capacitor Cdiff and a digital signal outputting unit applying a signal to the capacitor Cdiff. The digital signal outputting unit may generate a signal having a common level potential and first and second level potentials different from the common level potential, wherein the signal may be generated to have a phase opposite to that of the signal output from the digital signal outputting unit of the driving circuit unit 330.

Figure 4:
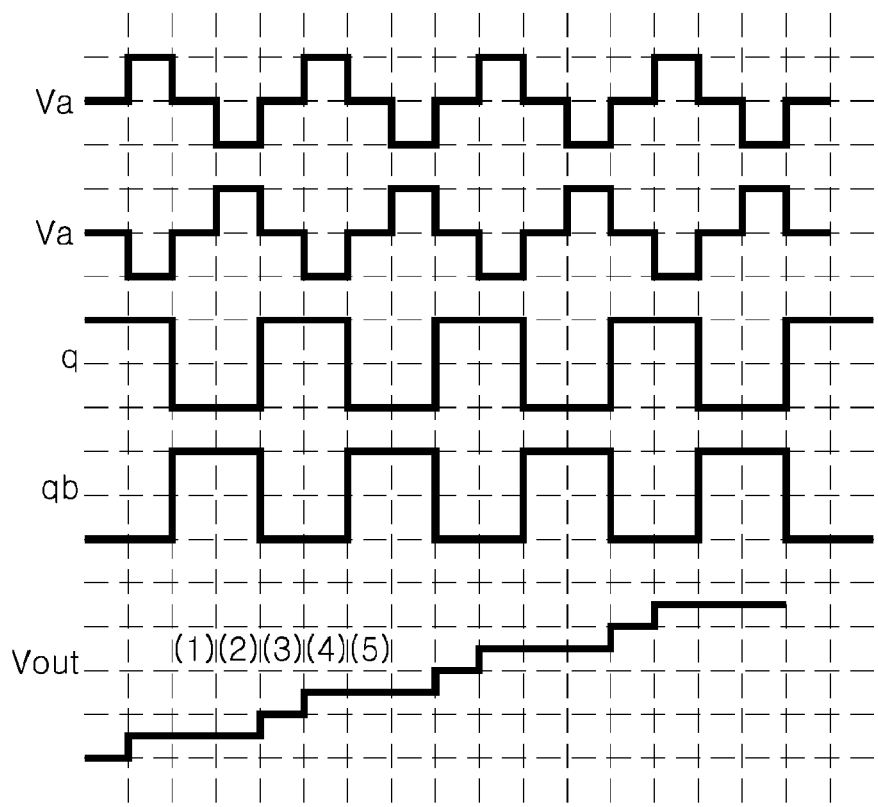
FIG. 4 is a view illustrating an operation of a capacitance sensing apparatus according to an embodiment of the present invention.

FIG. 4 is a view illustrating changes in level potentials of a driving signal and an output voltage value of the sensing circuit unit changed according to operations of a plurality of switches included in the sensing circuit unit. In the case in which a signal of the switch has a high level, it indicates that the switch is turned on, and in the case in which a signal of the switch has a low level, it indicates that the switch is turned off. Here, VCM indicates the common level potential, VDD indicates the first level potential higher than the common level potential, and 0 indicates the second level potential lower than the common level potential. Va indicates a signal applied to the capacitor Cdiff of the gain controlling circuit unit, Vb indicates a driving signal applied to the capacitor Cm, and Vout indicates an output voltage of the sensing circuit unit.

Operations in individual sections will be sequentially described.

In section (1), a signal having the common level potential is applied to the capacitor Cm, such that an amount of charge in the capacitor Cm is not changed. In addition, the switch q is turned off and the switch qb is turned on, such that the sensing circuit unit outputs the common level potential VCM and is held while maintaining the previous value.

In section (2), a signal having the first level potential VDD is applied to the capacitor Cm, such that charges corresponding to a difference between the first level potential VDD and the common level potential VCM are charged in the capacitor Cm. In addition, the switch q is turned off and the switch qb is turned on, such that the sensing circuit unit outputs the common level potential VCM and is held while maintaining the previous value.

In section (3), the signal having the common level potential is applied to the capacitor Cm and the switch q is turned on, such that the charges charged in the capacitor Cm are integrated and output through the sensing circuit unit. In section (3), an output potential difference ΔVp of the sensing circuit unit is represented by Equation 2.

$$\Delta Vp = \frac{Cm \cdot Cdiff}{Cf} \cdot [(VDD + Vnoise1) - Vcm] \qquad \text{Equation 2}$$

Here, Vnoise 1 indicates a magnitude of introduced noise in section (3).

In section (4), a signal having the second level potential 0 is applied to the capacitor Cm, such that charges corresponding to a difference between the common level potential VCM and the second level potential 0 are charged in the capacitor Cm. In this case, the switch q is turned on, such that the charges charged in the capacitor Cm are integrated and output through the sensing circuit unit. In section (4), an output potential difference ΔVn of the sensing circuit unit is represented by Equation 3.

$$\Delta Vn = \frac{Cm \cdot Cdiff}{Cf} \cdot [Vcm - Vnoise2] \qquad \text{Equation 3}$$

Here, Vnoise 2 indicates a magnitude of introduced noise in section (4).

In section (5), the signal having the common level potential VCM is applied to the capacitor Cm, such that the amount of charge in the capacitor Cm is not changed. In addition, the switch q is turned off and the switch qb is turned on, such that the sensing circuit unit outputs the common level potential VCM and is held while maintaining the previous value.

A total potential difference ΔVout of the output voltage Vout of the sensing circuit unit during sections (1) to (5) is represented by Equation 4.

$$\Delta Vout = \Delta Vp + Vn \qquad \text{Equation 4}$$

$$= \frac{Cm \cdot Cdiff}{Cf} \cdot [(VDD + Vnoise1) - Vcm] +$$

$$\frac{Cm \cdot Cdiff}{Cf} \cdot [Vcm - Vnoise2]$$

$$= \frac{Cm \cdot Cdiff}{Cf} \cdot \left[\left(VDD - \frac{VDD}{2}\right) + Vnoise1\right] +$$

$$\frac{Cm \cdot Cdiff}{Cf} \cdot \left[\frac{VDD}{2} - Vnoise2\right]$$

$$= \frac{Cm \cdot Cdiff}{Cf} \cdot VDD + \frac{Cm \cdot Cdiff}{Cf} \cdot [Vnoise1 - Vnoise2]$$

Here, the first level potential VDD has been calculated as a magnitude two times larger than that of the common level potential VCM. As seen in Equation 4, Vnoise1 and Vnoise2 are offset against each other and then output. In the case in which the common noises Vnoise1 and Vnoise2 have substantially the same magnitude, the final output voltage of the sensing circuit unit is not affected by the noises. Meanwhile, even in the case that the common noises Vnoise1 and Vnoise2 have different magnitudes, an influence of the noises on the final output voltage of the sensing circuit unit may be reduced as much as possible. In addition, capacitance of the capacitor Cdiff of the gain controlling circuit unit may be controlled to control a magnitude of the output voltage of the sensing circuit unit.

Figure 5:
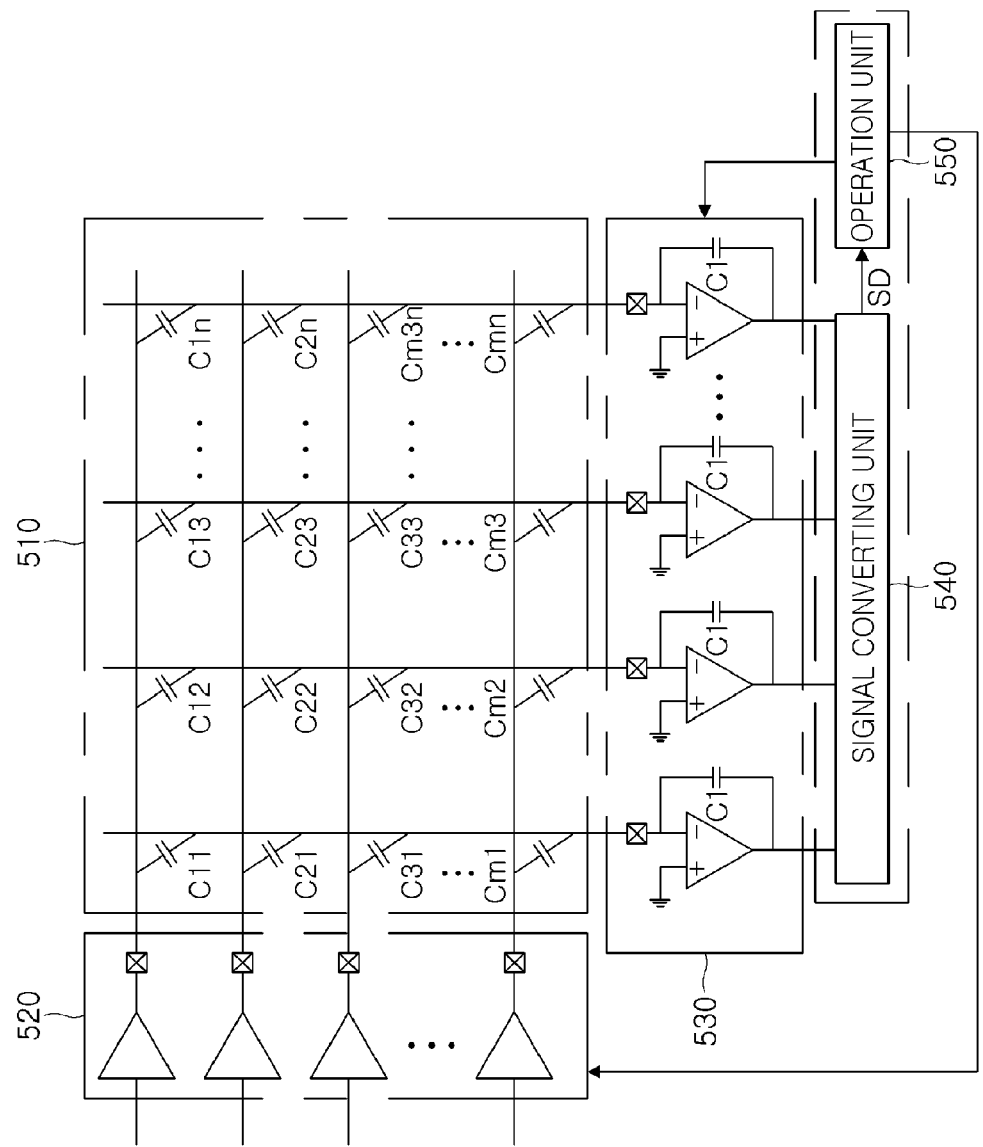
FIG. 5 is a view illustrating a touch screen apparatus including a capacitance sensing apparatus according to an embodiment of the present invention.

FIG. 5 is a view illustrating a touch screen apparatus including the capacitance sensing apparatus according to the embodiment of the present invention.

Referring to FIG. 5, the touch screen apparatus according to the present embodiment may include a panel unit 510, a driving circuit unit 520, a sensing circuit unit 530, a signal converting unit 540, and an operating unit 550. The panel unit 510 may include a plurality of first electrodes extended in a first axial direction, that is, a horizontal direction of FIG. 5 and a plurality of second electrodes extended in a second axial direction, that is, a vertical direction of FIG. 5, intersecting with the first axial direction. Here, changes in capacitance C11 to Cmn are generated in intersections between the first and second electrodes. The changes in capacitance C11 to Cmn generated in the intersections between the first and second electrodes may be changes in mutual capacitance generated by a driving signal applied to the first electrodes by the driving circuit unit 520. Meanwhile, the driving circuit unit 520, the sensing circuit unit 530, the signal converting unit 540, and the operating unit 550 may be implemented as a single integrated circuit (IC).

The driving circuit unit 520 may apply a predetermined driving signal to the first electrodes of the panel unit 510. The driving signal may be a square wave signal, a sine wave signal, a triangle wave signal, or the like, having a predetermined period and amplitude and be sequentially applied to each of the plurality of first electrodes. Although FIG. 5 shows that circuits for the generation and application of the driving signal are individually connected to the plurality of first electrodes, a single driving signal generating circuit may be provided to apply a driving signal to each of the plurality of first electrodes using switching circuits.

The sensing circuit unit 530 may include integrating circuits for sensing the changes in capacitance C11 to Cmn from the second electrodes. Each of the integrating circuits may include at least one operational amplifier and a capacitor C1 having a predetermined capacitance, wherein each of the operational amplifiers has an inverting input terminal connected to the second electrode to convert the changes in capacitance C11 to Cmn into an analog signal such as a voltage signal, or the like, and then output the analog signal. In the case in which the driving signal is sequentially applied to the plurality of first electrodes, since the changes in capacitance may be simultaneously detected from the plurality of second electrodes, the number of integrating circuits may correspond to the number (m) of second electrodes.

The signal converting unit 540 may generate a digital signal $S_D$ from an analog signal generated by the integrating circuit. For example, the signal converting unit 540 may include a time-to-digital converter (TDC) circuit measuring a time required for a voltage type analog signal outputted from the sensing circuit unit 530 to reach a predetermined reference voltage level and converting the measured time into a digital signal $S_D$ or an analog-to-digital converter (ADC) circuit measuring a variation in a level of an analog signal outputted from the sensing circuit unit 530 for a predetermined time and converting the measured variation into a digital signal $S_D$. The operating unit 550 may determine a touch input applied to the panel unit 510 using the digital signal $S_D$. As an example, the operating unit 550 may determine the number, coordinates, gesture operations, or the like, of touch inputs applied to the panel unit 510.

Comparing the capacitance sensing apparatus shown in FIGS. 2 and 3 and the touch screen apparatus shown in FIG. 5 with each other, the node capacitors C11 to Cmn generated in the intersections between the first and second electrodes may correspond to the capacitor Cm of FIGS. 2 and 3. In addition, the driving circuit unit 520 of FIG. 5 may correspond to the driving circuit units 230 and 330 of FIGS. 2 and 3, and the sensing circuit unit 530 of FIG. 5 may be a component including the sensing circuit units 210 and 310 and the gain controlling circuit units 220 and 320 of FIGS. 2 and 3.

As set forth above, according to embodiments of the present invention, when a driving signal having a common level potential and first and second level potentials different from the common level potential is applied to a capacitor, a change in capacitance of the capacitor according to the driving signal is integrated and output, whereby noises may be offset against each other.

While the present invention has been shown and described in connection with the embodiments, it will be apparent to those skilled in the art that modifications and variations can be made without departing from the spirit and scope of the invention as defined by the appended claims.

What is claimed is:

1. A capacitance sensing apparatus comprising:
a driving circuit unit to apply a driving signal, having a common level potential and a first level potential and a second level potential that are different from the common level potential, to a first capacitor which detects a touch of a user;
a sensing circuit unit comprising a first switch connected between a sensing circuit gain control input and a sensing circuit input of an amplifying circuit, a second switch connected between the sensing circuit gain control input and a common level potential, the sensing circuit input is connected to the first capacitor through the first switch to detect a change in capacitance generated in the first capacitor, the sensing circuit gain control input to control a gain of the sensing circuit unit, and a sensing circuit output to output the sensing circuit input according to the gain of the sensing circuit unit which is controlled by the sensing circuit gain control input; and
a gain controlling circuit unit connected to the sensing circuit gain control input and to control the gain of the sensing circuit unit,
the sensing circuit unit including a second capacitor charged by the change in capacitance generated in the first capacitor when a level of the driving signal is changed from the first level potential to the common level potential or when the level of the driving signal is changed from the common level potential to the second level potential, and
the gain controlling circuit unit including at least one gain controlling capacitor, which is charged and/or discharged by an input signal, to control the gain of the sensing circuit unit.

2. The capacitance sensing apparatus of claim 1, wherein the input signal has a phase opposite to that of the driving signal applied by the driving circuit unit to control the gain of the sensing circuit unit.

3. The capacitance sensing apparatus of claim 2,
wherein the input signal, which charges and/or discharges the at least one gain controlling capacitor, is driven by a digital signal outputting unit, and
wherein the at least one gain controlling capacitor is connected in series between the digital signal outputting unit and an input to the sensing circuit unit.

4. The capacitance sensing apparatus of claim 1, further comprising an operating unit to determine a touch input based on an output signal of the sensing circuit unit.

5. The capacitance sensing apparatus of claim 1, wherein a level of an output signal of the sensing circuit unit is increased when the level of the driving signal is changed from the first level potential to the common level potential or when the level of the driving signal is changed from the common level potential to the second level potential.

6. The capacitance sensing apparatus of claim 1, wherein the sensing circuit unit includes an integrating circuit non-inverting and integrating the second capacitor by the driving signal.

7. The capacitance sensing apparatus of claim 6, wherein a level of an output signal of the sensing circuit unit is increased at least twice during a single period of the driving signal.

8. The capacitance sensing apparatus of claim 1,
wherein the sensing circuit unit controls the gain of the sensing circuit unit to amplify the sensing circuit input according to the sensing circuit gain control input and to output the amplified sensing circuit input at the sensing circuit output, and
wherein the amplified sensing circuit input, which is output at the sensing circuit output, is greater than or less than the sensing circuit input.

9. The capacitance sensing apparatus of claim 8, wherein the magnitude of the gain is an amplification that is used to amplify the sensing circuit input and to output the amplified sensing circuit input at the sensing circuit output.

10. A method of sensing changes in capacitance in a plurality of first capacitors, which detect a touch of a user, defined in intersections between a plurality of first electrodes and a plurality of second electrodes, the method comprising:
applying a driving signal having a common level potential and a first level potential and a second level potential that are different from the common level potential to at least one of the plurality of first capacitors, which detects a touch of a user, to charge the at least one of the plurality of first capacitors;
generating an output voltage by charging a second capacitor with the charge of the at least one of the plurality of first capacitors when a level of the driving signal is changed from the first level potential to the common level potential or when the level of the driving signal is changed from the common level potential to the second level potential; and
controlling a gain of the output voltage with a gain controlling capacitor connected to a sensing circuit gain control input to be charged and/or discharged according to an input signal that is input through a sensing circuit input,
wherein a first switch is connected between the sensing circuit gain control input and the sensing circuit input of a non-inverting amplifying circuit and a second switch is connected between the sensing circuit gain control input and the common level potential.

11. The method of claim 10, wherein the input signal has a phase opposite to that of the driving signal.

12. The method of claim 10, wherein the generating of the output voltage is performed by allowing the output voltage to be increased when the level of the driving signal is changed from the first level potential to the common level potential or changed from the common level potential to the second level potential, through the non-inverting amplifying circuit.

13. The method of claim 12, further comprising determining a touch input generating the change in capacitance based on the output voltage.

14. A touch screen apparatus comprising:
- a panel unit including a plurality of driving electrodes and a plurality of sensing electrodes;
- a driving circuit unit to apply a driving signal to the plurality of driving electrodes;
- a sensing circuit unit comprising a first switch connected between a sensing circuit gain control input and a sensing circuit input of an amplifying circuit, a second switch connected between the sensing circuit gain control input and a common level potential, the sensing circuit input is connected to a first capacitor of the driving circuit through the first switch to sense changes in capacitance of the first capacitor, which detects a touch of a user, generated in intersections between the driving electrodes to which the driving signal is applied and the plurality of sensing electrodes, the sensing circuit gain control input to control a gain of the sensing circuit unit, and a sensing circuit output to output the sensing circuit input according to the gain of the sensing circuit unit which is controlled by the sensing circuit gain control input; and
- a controlling unit to control operations of the driving circuit unit and the sensing circuit unit,
- the driving signal having a common level potential and first and second level potentials different from the common level potential, the controlling unit including a gain controlling circuit unit controlling a gain of the sensing circuit unit, and
- the gain controlling circuit unit having at least one gain controlling capacitor, and the gain controlling circuit unit providing a gain control signal to control the gain of the sensing circuit unit.

15. The touch screen apparatus of claim 14, wherein the at least one gain controlling capacitor is charged and/or discharged by the input signal which has a phase opposite to that of the driving signal to control the gain of the sensing circuit unit.

16. The touch screen apparatus of claim 14, wherein the sensing circuit unit generates an output signal transferred to the controlling unit based on the changes in capacitance when a level of the driving signal is changed from the first level potential to the common level potential or changed from the common level potential to the second level potential.

17. The touch screen apparatus of claim 16, wherein the controlling unit determines a touch input applied to the panel unit based on the output signal of the sensing circuit unit.

18. The touch screen apparatus of claim 16, wherein the sensing circuit unit generates the output signal of which a level is increased at least twice during a single period of the driving signal.

\* \* \* \* \*